Patented June 3, 1930

1,761,291

UNITED STATES PATENT OFFICE

ROBERT S. BLY, OF LAKELAND, FLORIDA, ASSIGNOR, BY MESNE ASSIGNMENTS, TO CUTLER-HAMMER, INC., A CORPORATION OF DELAWARE

ANILINE-SULPHUR RESIN AND PROCESS OF MAKING SAME

No Drawing. Application filed June 29, 1925, Serial No. 40,456.

This invention relates to synthetic resins and methods of producing the same.

An object of the invention is to provide novel resins adapted to use in the plastic art.

Another object is to provide resins of the aforementioned character having a marked degree of thermoplasticity which adapts the same to hot molding operations.

Another object is to provide resins of this type which are adapted to hot molding either with or without the addition of suitable filler materials.

Another object is to provide resins having smooth and glossy surfaces when hot molded into the desired shapes, thus obviating the usual surface finishing operations on the molded articles.

Another object is to provide resins produced from reactive substances requiring heat to initiate and continue the reaction, whereby the latter may be accurately controlled or regulated.

Another object is to provide novel methods for accomplishment of the aforementioned desirable results.

Another object of the invention is to produce a relatively inert synthetic resin.

Other objects and advantages of the invention will hereinafter appear.

When a mixture of aniline and sulphur is heated to the boiling point, little or no reaction takes place; or if a reaction does take place it is very slow. However, upon addition to the mixture of certain catalysts, such as nickel, iodine, or tungstic acid, reaction at a relatively rapid rate is effected. The reaction takes place quite readily at the boiling point of aniline, with the evolution of a large quantity of hydrogen sulphide, and the liquid gradually changes over to a resinous substance, the melting point of which depends upon the period of heating, and also upon the relative quantity of sulphur employed. An important advantage results from the fact that this reaction goes on at an appreciable rate only at the boiling point of aniline; that is, the reaction requires the addition of heat to proceed. This makes the reaction easy to control, inasmuch as progress of the reaction may be stopped by discontinuing the application of heat.

While I have referred particularly to the employment of aniline as a reactive substance, it is to be understood that other amino compounds of benzene, such as ortho-toluidine, may be substituted therefor, with attainment of similar results.

As an example of the manner of practicing my invention, I mix about 930 parts by weight of aniline, 576 parts of sulphur, and 6 parts of powdered nickel. This mixture may be boiled in a reflux condenser for a period of twenty hours, when a resin having a melting point of about 200 degrees F. is obtained. A similar quantity of iodine or tungstic acid may be substituted for the nickel as a catalyst in the foregoing example.

As a further example, I may mix 642 parts of ortho-toluidine, 384 parts of sulphur, and 6 parts of iodine; this mixture being refluxed as aforedescribed for a period of fifteen hours. The resinous reaction product in this case has a melting point of about 175 degrees F.

As a still further example, a resin having a melting point of about 220 degrees F. may be obtained by refluxing, for a period of seven hours, about 642 parts of ortho-toluidine, 512 parts of sulphur and 1 part of iodine.

Resins made in accordance with the above processes are thermoplastic. When mixed with suitable fillers they may be molded under heat and pressure into various shapes.

In preparing a molding compound the resin may be mixed with a suitable filler on differential rolls, or the constituents of the compound may be intimately mixed and reduced to powder form by grinding the same in a ball mill.

A molding compound may be made from 40 parts of the resin described in the second example (having a melting point of 175 degrees F.), together with 54 parts of rotten stone and 6 parts of cotton flock. These constituents are mixed on differential rolls, and the sheets thus formed are softened on a hot plate at a temperature of about 300 degrees F. The softened compound is then placed in a die heated to about 250 to 300 degrees F., and molded under pressure to the desired shape. The die is then cooled and the molded article removed.

The compound in powder form may be molded according to the method employed for molding phenolic condensation products. That is, the cold compound is placed in a cold die, and heat and pressure simultaneously applied,—the temperature employed ranging from 250 to 300 degrees F. When the molding operation is completed, the die is cooled while maintaining the pressure, and the article is then removed.

While I have specifically referred to but one resin of this type in preparing molding compounds, it will be apparent to those skilled in the art that such resins having different melting points may be employed,—it being only necessary to adjust the molding temperature according to the melting point of the resin. Similarly, other fillers, such as wood flour, asbestos, etc., may be employed.

Hot molded articles produced in accordance with my invention have extremely smooth and glossy surfaces, and hence do not require the usual surface finishing treatment. Such articles, moreover possess a high degree of mechanical strength and have good electrical insulating properties.

While "nickel" is specifically mentioned in certain of the claims, it is to be understood that corresponding proportions of other suitable catalysts may be employed if desired.

What I claim and desire to secure by Letters Patent is:

1. A thermoplastic resin which is the product of reaction of about 930 parts of aniline and about 576 parts of sulphur in the presence of about 6 parts of nickel.

2. A thermoplastic resin which is the product of reaction of about 930 parts of aniline and about 576 parts of sulphur in the presence of about 6 parts of nickel, said resin having a melting point of 175 to 220 degrees F.

3. A thermoplastic resin which is the product of reaction of about 930 parts of aniline and about 576 parts of sulphur in the presence of about 6 parts of nickel, said resin having a melting point of 175 to 220 degrees F. and having a smooth and lustrous appearance when hot molded into the desired shape.

4. The process of producing a thermoplastic resin which comprises heating under a reflux condenser a mixture of sulphur and an amino compound of benzene in the presence of a quantity of nickel.

5. The process of producing a thermoplastic resin which comprises heating under a reflux condenser a mixture of about 576 parts of sulphur and about 930 parts of aniline, said mixture being treated in the presence of a quantity of powdered nickel as a catalyst.

6. The process of producing a resin adapted for hot molding which comprises boiling under a reflux condenser for a period of about twenty hours a mixture of about 930 parts of aniline and about 576 parts of sulphur in the presence of about 6 parts of nickel.

7. The process of producing a thermoplastic molding compound which comprises effecting reaction by boiling under a reflux condenser for a period exceeding six hours about 930 parts of aniline and about 576 parts of sulphur in the presence of about 6 parts of nickel, and then mixing the resinous reaction product with a quantity of filler material.

8. The process which comprises boiling under a reflux condenser for a period of about twenty hours about 930 parts of aniline and 576 parts of sulphur in the presence of 6 parts of nickel to produce a resin having a melting point of about 200 degrees F., mixing a quantity of the resin with a relatively larger quantity of filler material and then molding the mixture in pressure dies at a temperature of 250 to 300 degrees F.

9. A resin adapted for hot molding which is the product of reaction of about five molecular proportions of aniline and about nine atomic proportions of sulphur in the presence of a catalyst.

10. A resin which is the product of reaction of five molecular proportions of aniline and nine atomic proportions of sulphur in the presence of a quantity of nickel.

11. A resin which is the product of reaction of five molecular proportions of aniline and nine atomic proportions of sulphur in the presence of less than one per cent of nickel.

12. A thermoplastic molding compound comprising a filler, and a resin which is the product of reaction of about nine atomic parts by weight of sulphur and about five molecular parts by weight of an amino compound of benzene in the presence of less than one per cent by weight of a catalytic agent.

13. A thermoplastic molding compound comprising a filler, and a resin which is the product of reaction of about nine atomic proportions of sulphur and five molecular proportions of aniline in the presence of a catalytic agent.

14. A thermoplastic molding compound comprising a filler, and a resin which is the product of reaction of more than three atomic proportions of sulphur and two molecular proportions of aniline in the presence of a relatively small quantity of nickel.

15. The process of producing a thermoplastic resin which comprises heating under a reflux condenser a mixture of more than three atomic proportions of sulphur and two molecular proportions of an amino compound of benzene in the presence of a quantity of nickel.

16. The process of producing a resin adapted for hot molding which comprises boiling under a reflux condenser for a period exceeding six hours a mixture of sulphur and an amino compound of benzene in the ratio of more than three atomic proportions of sulphur to each two molecular proportions of the amino compound of benzene, such refluxing being carried on in the presence of a catalytic agent comprising nickel.

17. The process of producing a thermoplastic molding compound which comprises boiling under a reflux condenser about 576 parts of sulphur and about 930 parts of aniline in the presence of a small quantity of a catalytic agent, and then intimately mixing the resulting reaction product with a suitable filler material.

18. The process which comprises boiling under a reflux condenser about 930 parts of aniline and 576 parts of sulphur in the presence of 6 parts of nickel to produce a resin having a melting point of about 200 degrees F., mixing a quantity of the resin with a relatively larger quantity of filler material, and then molding the mixture by application of heat and pressure.

19. The process of producing a thermoplastic molding compound which comprises boiling under a reflux condenser, in the presence of a small quantity of a catalytic agent comprising nickel, a mixture of sulphur and an amino compound of benzene having a ratio of nine atomic parts by weight of sulphur to each five molecular parts by weight of the amino compound of benzene, and then intimately mixing the resulting reaction product with a suitable filler material.

In witness whereof, I have hereunto subscribed my name.

ROBERT S. BLY.